Aug. 10, 1954

W. R. KOCH

REDUCTION OF AMPLITUDE MODULATION IN FREQUENCY MODULATION RECEIVERS

Filed Aug. 30, 1950

2,686,259

INVENTOR
Winfield R. Koch
BY H. L. Newton
ATTORNEY

Patented Aug. 10, 1954 2,686,259

UNITED STATES PATENT OFFICE 2,686,259

REDUCTION OF AMPLITUDE MODULATION IN FREQUENCY MODULATION RECEIVERS

Winfield R. Koch, Marlton, N. J., assignor to Radio Corporation of America, a corporation of Delaware Application August 30, 1950, Serial No. 182,233

10 Claims. (Cl. 250—20)

This invention relates in general to systems for absorbing sudden variations in amplitude of angle-modulated carrier waves. In particular the invention relates to variably loaded frequency-modulation circuits in which the circuit loading is made responsive to amplitude modulations of a carrier wave.

When frequency-modulated carrier waves are passed through a frequency-modulation (FM) receiver, the demodulation output voltage at the detector or demodulator stage should be independent of variations caused by amplitude changes in the received FM carrier wave. Such amplitude changes may be caused in various ways, as by multiple signal transmission paths causing a plurality of waves to arrive at the receiver in different phase relationships causing interference or as by a phenomenon known as airplane flutter. It is well known in the art that such amplitude changes cause signal distortion or they may cause a low frequency fluctuation of the modulation frequencies which is objectionable since ordinary gain control systems do not adequately compensate therefor. Therefore, it is desirable to provide means for absorbing such amplitude variations in an FM receiver.

Certain FM detector circuits have been provided which are to a certain degree inherently non-responsive to amplitude variations of the FM carrier wave. However, changes in carrier wave amplitude may change the operating conditions of carrier wave amplifier tubes in the receiver and therefore produce undesirable output voltages even when used with the improved FM detector circuits. For this reason it has been found difficult to eliminate airplane flutter and other similar disturbances in the detector output signal.

Accordingly M. S. Corrington in his copending application, Ser. No. 731,193, filed February 27, 1947, for "Variable Transformer Loading Circuit," now matured into Patent 2,561,059, has provided a further means for absorbing sudden variations in FM carrier wave amplitude. Also the copending W. R. Koch application, Ser. No. 730,606, filed February 24, 1947, for "Frequency Modulation Transformer Loading Circuit," now Patent 2,561,058, provides a system for absorbing such sudden variations in amplitude in an FM receiver. These circuit arrangements have operated very satisfactorily in rejecting airplane flutter and like amplitude disturbances of the carrier wave. They both, however, require large capacitors of the order of 5 to 10 microfarads. Such capacitors not only are expensive to manufacture but are generally of the electrolytic type. As a result they may deteriorate after a certain operating time and thereafter do not provide satisfactory absorption of the amplitude variations.

Certain other systems, such as that disclosed by N. J. Korman in U. S. Patent No. 2,420,249, entitled "Amplitude Modulation Reducing Circuit," have used degenerative feedback systems for reducing amplitude variations of FM carrier waves. These have in general, however, also been too expensive in manufacture to warrant general usage.

It is therefore a primary object of the invention to provide a simplified system for reduction of amplitude modulation of the frequency-modulated carrier wave in FM receivers.

A more specific object of the invention is to provide a system of the nature referred to in the Corrington and Koch applications which may provide absorption of amplitude modulation of an angle-modulated carrier wave without the use of large electrolytic capacitors.

Another object of the invention is to provide an improved amplifier circuit which absorbs amplitude modulation variations in an FM carrier wave in an economical manner.

Other features and objects of the invention will best be understood by reference to the following description and the accompanying drawing, in which.

Figures 1, 2, 3, 4:
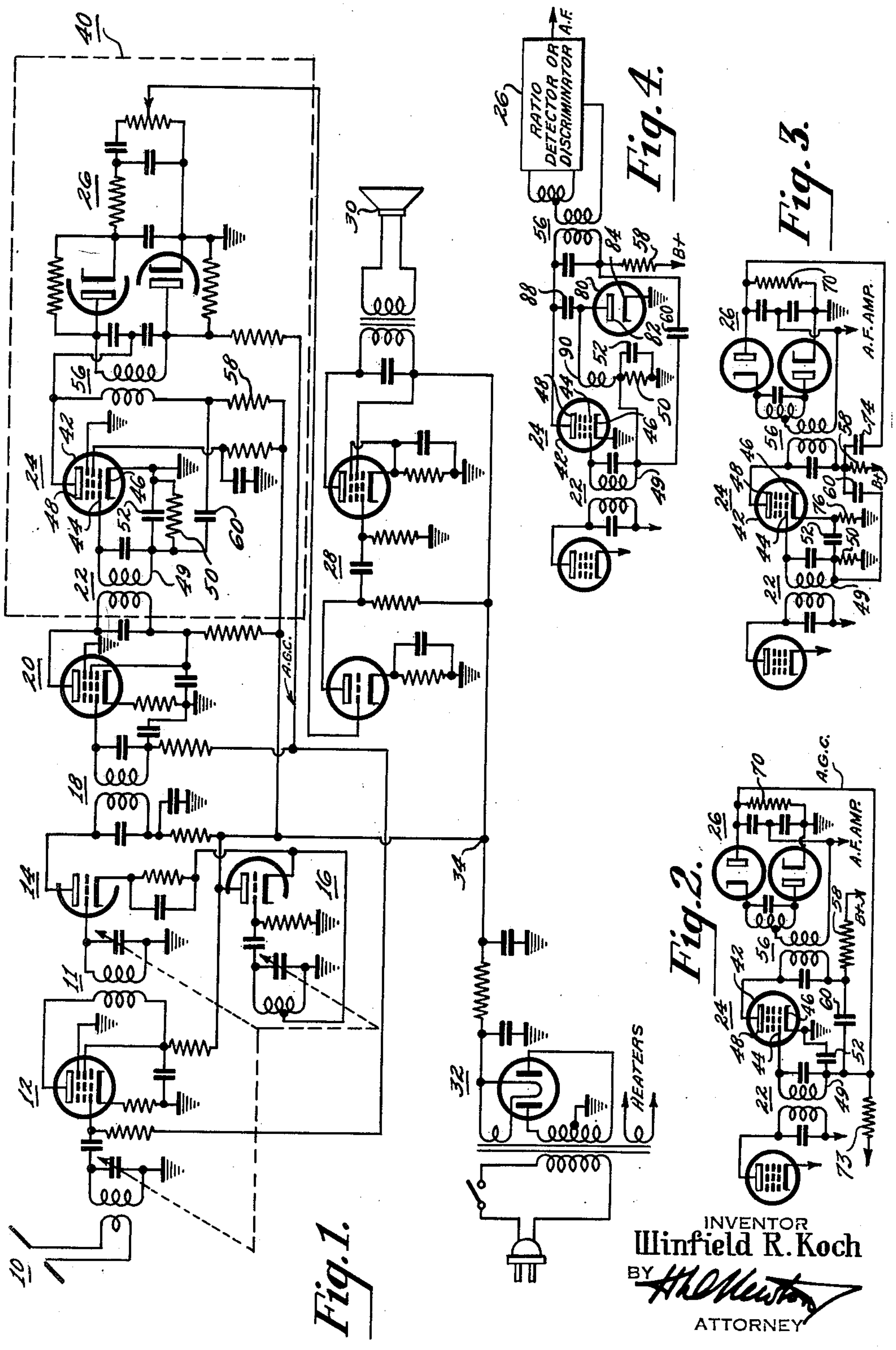
Figure 1 is a schematic circuit diagram of an FM receiver embodying the invention.
Figures 2, 3 and 4 are schematic circuit diagrams of electronic amplifiers including certain modifications of the invention.

Referring now to the drawing, like reference numerals represent like parts throughout the figures. In particular, referring to Figure 1, a signal input source such as a dipole antenna 10 is coupled to a variably tuned radio-frequency (R.-F.) amplifier stage 12. A coupling circuit 11 in turn connects the amplifier 12 to a mixer stage 14 with which an oscillator circuit 16 is associated to convert, in accordance with well known superheterodyne receiver principles, the propagated carrier wave frequency into an intermediate-frequency (I.-F.) carrier wave at the I.-F. input transformer 18. Since operation of the circuit up to this point is well known to those skilled in the art, it need not be described in further detail.

A first I.-F. amplifier stage 20 is coupled to the I.-F. input transformer 18. This stage 20 is in turn coupled by a second I.-F. transformer 22 to a further I.-F. amplifier stage 24. To the output of this stage 24 is coupled a discriminator rectifier 26 as described in U. S. Patent 2,410,983 (Koch). The discriminator rectifier 26 is shown for purposes of illustration only, and it is to be recognized that the invention is not limited thereto, but may be likewise used in conjunction with any suitable FM demodulating means such as a ratio detector. The terms "frequency-modulated," "FM," or "frequency modulation" are also used herein only for purpose of illustration, and the invention is not limited thereto, but may be used with associated types of modulation such as phase and combination phase and frequency.

The demodulator 26 is in turn coupled in cascade through a suitable audio-frequency amplifier section 28 to a reproducing device such as a speaker 30. A conventional power supply circuit 32 provides between the terminal 34 and ground a requisite high voltage or anode potential for the respective electronic tubes connected in the receiver.

There is contained within the dotted enclosure 40 the improved amplifier system to which the invention is directed. Figures 2 to 4 relate to modifications of the invention which may be employed within the enclosure 40. The details of operation of these modifications will be discussed hereinafter.

In the enclosure 40, an electronic amplifier tube 42 or other suitable amplifying device is provided including at least a control electrode 44, a cathode 46, and an anode 48. A series input circuit including a resonant I.-F. transformer secondary circuit 49 and a transformer loading resistor or other suitable resistance device 50, is connected between the cathode 46 and control electrode 44 of the tube 42. A suitable I.-F. bypass capacitor 52 is connected in shunt with the loading resistor 50 to lower the impedance presented to the carrier wave.

It is noted that, in the copending Koch application, identified above, the capacitor required to bypass the resistor 50 for reducing low-frequency amplitude variations, is a large electrolytic capacitor of the order of 5 to 10 microfarads. Such a capacitor presents a high impedance to the converted intermediate-frequency carrier wave because of its inherent internal inductance and therefore the I.-F. bypass capacitor 52 is normally required even when the larger capacitor is used at this place in the circuit. Thus, no additional component part is required in the circuit up to this point, and the large capacitor is not used. As will hereinafter be described in detail, a small capacitor is used instead to afford the same functional results in accordance with this invention.

An output circuit for the second I.-F. stage or the electronic amplifier tube 42 includes a transformer or resonant frequency discriminator network 56 connected to the tube anode 48. In series with the primary winding of the transformer and the anode supply voltage terminal is a resistor or other low-frequency impedance 58. A feedback path consisting of a capacitor 60 is connected between the resistor 58 and the resistor 50 to degeneratively feed back voltage disturbances at the low-frequency impedance 58, which correspond to low-frequency amplitude variations of the carrier wave.

It is possible to feed back only the low frequency disturbances since the tuned circuit 56 presents a very much larger impedance to the carrier wave than the resistor 58, but has essentially a very low impedance for the low-frequency amplitude variations of the carrier wave as compared with the resistance 58. It is to be recognized that the term "carrier wave," as used in this specification and the appended claims, is meant to define a frequency-modulated wave whether at the propagated carrier-wave frequency or at the converted intermediate frequency. Although the invention is illustrated in connection with intermediate-frequency amplifier stages, it is recognized by those skilled in the art that it may not necessarily be limited thereto.

The feed-back capacitor 60, which functionally replaces the large electrolytic capacitors of the prior art, may be a small paper capacitor having a capacity in the order of .25 microfarads. Such a capacitor gives the effect of the larger electrolytic capacitor in accordance with the invention. Thus, when the signal amplitude increases, the bias on the amplifier tube 42 will tend to increase because of increased grid current, and the increased bias tends to reduce the plate current, making the voltage across the resistor 58 more positive. It therefore takes more electrons to charge up the grid side of the feedback capacitor 60, and the same operation results as if a large electrolytic capacitor had been used across the loading resistor 50.

Therefore in accordance with the invention an improved circuit is provided wherein a small paper capacitor 60 may be used rather than a larger electrolytic capacitor shunting the cathode resistor 50. The size of the feedback capacitor 60 and the low-frequency impedance resistor 58 is of course selected to provide the same effect as the larger electrolytic capacitor. Typical values for these components to give an effective time constant in the order of 0.1 second would be in the order of .25 microfarads capacity for the capacitor 60 and 10,000 ohms resistance for the resistor 58. Thus an R-C time constant of the order of 0.0025 second is effective to provide the same functional performance as the 0.1 second time constant formerly required.

Since the operation of the circuit in reducing the adverse effects of amplitude variations of the carrier wave is essentially the same as that of the copending Koch application, further explanation of the manner in which amplitude modulation rejection is accomplished will be unnecessary. It might be noted, however, that the loading resistor 50 preferably has an effective impedance to the carrier wave of the order of the effective impedance presented by the resonant input I.-F. transformer circuit 49, which is connected in series therewith. In this manner the transformer 22 is variably loaded in accordance with a voltage derived from low-frequency variations in carrier wave amplitude. Thus sudden variations in amplitude of the carrier wave are absorbed and the airplane flutter or like disturbance is essentially eliminated.

The degenerative feedback voltage is used in effect to increase the capacity of the feedback capacitor to provide in combination with the loading resistor 50 a circuit having an actual time constant in the order of 0.0025 second, but an effective time constant in the order of 0.1 second. This is of the proper order for removing low-frequency amplitude disturbances from a carrier wave frequency modulated with audio-frequency signals. Other time constants might be used in accordance with the invention should the modulation be effected in accordance with a supersonic frequency or any other signal which is not of audio frequency. Thus, the low frequency disturbances might be of a different order of frequency, requiring a time constant different than that used above for purposes of illustrating the invention. In any event, the effective time constant of the loading resistance device and the feedback capacitor is long compared to the lowest frequency signal component with which the carrier wave is modulated. It is noted that the amplifier 42 in this embodiment of the invention is provided only with grid leak bias.

The present invention may alternatively be used for replacing the large capacitor used in a ratio detector. Figure 2 shows one circuit of this type, which also provides automatic gain control. The ratio detector resistor 70 is usually bypassed with an electrolytic or stabilizing capacitor of 5 to 10 microfarads. By using the I.-F. amplifier tube 42 also as a low-frequency amplifier, the small capacitor 60 is made as effective as the usual large capacitor in the same manner outlined above. That is, low frequency amplitude variations are converted into voltages at the impedance 58, and the degenerative feedback of these voltages causes the feedback capacitor 60 to require more electrons to charge to a predetermined operating value. Thus a 0.25 microfarad capacitor may replace the large electrolytic capacitor formerly required. The direct current component of the voltage developed across the detector load resistor 70 is used for automatic gain control (AGC) of amplifier 42 as as well as that of other amplifier tubes (not shown), as indicated at terminal 73.

An A-G-C voltage is applied by means of the lead 72 to the control electrode 44 of the I.-F. amplifier tube 42. It is noted that such an A-G-C circuit will not of itself provide compensation for the low frequency disturbances caused by amplitude variations in the carrier wave. Therefore, the feedback path comprising the capacitor 60 is essential to provide improved performance in the presently described combination, by absorbing these variations.

Figure 3 shows a system similar to that of Figure 2, using the feedback capacitor 60 rather than a large electrolytic capacitor, but having no A-G-C voltage feedback path. This is necessary if the loading of the demodulator circuit by the A-G-C circuit is undersirable. In this embodiment, however, a second feedback path for alternating-current variations is provided from the detector resistor 70 to the low-frequency impedance device 58 by means of a coupling capacitor 74. A small cathode resistor 76 also bypassed for intermediate frequencies, along with resistor 50, by the bypass capacitor 52, is connected between cathode 46 and ground to provide a small amount of cathode bias for the amplifier tube 42 thereby preventing any grid current rectification. There is thereby provided in this embodiment of the invention an amplifier giving improved performance in providing an essentially constant-amplitude carrier-wave output level at the input portion of the demodulator circuit 26. The D. C. component of the voltage developed across resistor 70 may be used for automatic gain control of other amplifier tubes, when loading is not objectionable.

As above mentioned the Corrington system also requires a large electrolytic capacitor. The present invention, however, may be used furthermore in connection with a modification of the Corrington system as shown in Figure 4. The feedback capacitor 60 operates in an identical manner, as in the other modifications of the invention, to replace a larger capacitor. The larger capacitor required across the resistance device 50 in the Corrington system is replaced in accordance with this invention by a smaller capacitor without any sacrifice in performance. The small signal bypass capacitor 52 is also required in the Corrington system with the large capacitor and so only the feedback capacitor 60 is used for accomplishing the results obtained formerly by a much larger capacitor.

In this embodiment the carrier-wave amplitude variations at the frequency discriminating network 56 are absorbed to some extent by the diode rectifier 80, which has an anode 82 and cathode 84. It is to be noted that the Corrington system is used with the diode 80 connected across the last I.-F. transformer secondary. In this embodiment, however, a ratio detector is used to eliminate normal variations of the carrier wave amplitude and the rectifier network is provided to eliminate the low frequency component of the variations not normally otherwise eliminated. The diode is coupled for alternating current operation only to the anode 48 of the electron amplifier tube 42 by the capacitor 88. A direct current discharge path is provided for the rectifier comprising a series R.-F. isolating choke coil 90 and a loading resistor 50. The loading of the primary of the transformer 56 is therefore varied in accordance with the low frequency component of the amplitude variations present in the carrier wave by means of the diode rectifier 80, in a manner distinct from that of the Corrington application.

As indicated above, low frequency variations of the carrier wave are not entirely compensated in the prior art systems without the provision of a very large electrolytic capacitor across the loading resistor 50. Therefore in accordance with the invention a feedback path comprising the capacitor 60 is provided whereby variations in amplitude of the carrier wave are absorbed in an improved and more economical manner.

Therefore in accordance with the invention there is provided an improved amplifier for reducing amplitude-modulation variations of the carrier wave in frequency-modulation receivers. The improved performance is provided by means of a degenerative feedback path for only the low-frequency component of amplitude modulation upon an angle-modulated carrier wave, whereby there is no appreciable loss to the normal carrier-wave amplitude level. Thereby a simplified system is provided wherein a loading resistor coupled to input terminals of a carrier-wave amplifier and a feedback capacitor coupled to a low-frequency resistance in the amplifier output circuit provide in combination a degenerative feedback circuit having an effective time constant which is long compared to the lowest frequency modulation signals with which the carrier wave is modulated, thereby degeneratively feeding back only amplitude variations which are of a lower frequency than the signals.

The invention, which is hereinbefore fully described both as to construction and as to manner of operation, is therefore set out with particularity in the appended claims as to features of novelty.

What is claimed is:

1. An amplifier system for frequency-modulated carrier waves, comprising in combination, an electron amplifier device having at least a control electrode, cathode and anode, a resonant carrier wave input circuit, a loading resistance device, a series circuit including the resonant input circuit, the control electrode, and cathode of said electron amplifier and the loading resistance device, thereby to provide a direct current path between said control electrode and cathode including said loading resistance device, said loading resistance device having a resistance which is of the order of the effective impedance presented by said resonant input circuit to said carrier waves, a carrier wave frequency bypass capacitor shunting said resistance device to prevent degeneration of the carrier wave, an output circuit for said electron amplifier having resonant carrier wave means connected to said anode, a low-frequency impedance included in said output circuit, and a feedback path connected directly between said low-frequency impedance and said resistance device and including a feedback capacitor to feed back only low frequency amplitude variations of the carrier wave, whereby variations in amplitude of the carrier wave are absorbed by said resonant input circuit without appreciable loss to the normal carrier wave amplitude level.

2. An amplifier system as defined by claim 1 wherein a frequency modulation detector is coupled to said output circuit, and said resistance device comprises a resistor in the output circuit of said detector.

3. An amplifier system as defined by claim 1 wherein a rectifier having an anode and a cathode is connected for alternating current operation to said anode of the electron amplifier, a direct-current discharge path is provided for said rectifier, and said resistance device comprises a portion of said direct-current path.

4. An amplifier system as defined by claim 1 wherein a frequency modulation detector is provided having a resistor in the output circuit, and a second feedback path is provided from said last mentioned resistor to said low frequency impedance.

5. An amplifier system as defined by claim 1 wherein the signal is of audio frequency and the effective time constant of the loading resistance device and the feedback capacitor is in the order of 0.1 second.

6. An amplifier system as defined by claim 1 wherein the signal is of audio frequency and the R-C time constant of the loading resistance device and the feedback capacitor is in the order of 0.0025 second.

7. An amplifier system as defined by claim 1 wherein the effective time constant of the loading resistance device and the feedback capacitor is long compared with the lowest frequency-modulation signal component with which the carrier wave is frequency modulated.

8. An amplifier system as defined by claim 1 wherein an automatic gain control voltage circuit is provided, and said resistance device comprises a resistor common to said automatic gain control voltage circuit.

9. In a receiving system for frequency-modulated carrier waves, an electron amplifier for said carrier waves having at least a control electrode, cathode and anode, a resonant carrier wave input circuit, a first resistor, a series circuit including said resonant input circuit, the control electrode and cathode of said electron amplifier and the first resistor, said resistor having a resistance which is of the order of the effective impedance presented by said resonant input circuit to said carrier waves, and means including a second resistor connected in space current path of said amplifier to provide degenerative feedback voltage derived from low frequency variations in carirer wave amplitude, a capacitor connecting said means to said first resistor, said capacitor and first resistor having a time constant which is large as compared with the lowest frequency signal component with which the carrier wave is modulated, whereby low frequency variations in amplitude of said carrier waves are absorbed by said resonant input circuit.

10. A system as defined in claim 9 wherein a frequency modulation detector is coupled to said amplifier device and at least a portion of said feedback voltage is derived from said detector.

References Cited in the file of this patent

UNITED STATES PATENTS

| Number | Name | Date |
|---|---|---|
| 2,420,249 | Korman | May 6, 1947 |
| 2,471,301 | Koch | June 7, 1949 |
| 2,477,391 | Reid et al. | July 26, 1949 |
| 2,491,809 | Fyler | Dec. 20, 1949 |